July 5, 1927.
H. V. LUDWICK
WHEEL
Original Filed Aug. 1, 1922    2 Sheets-Sheet 1
1,634,786
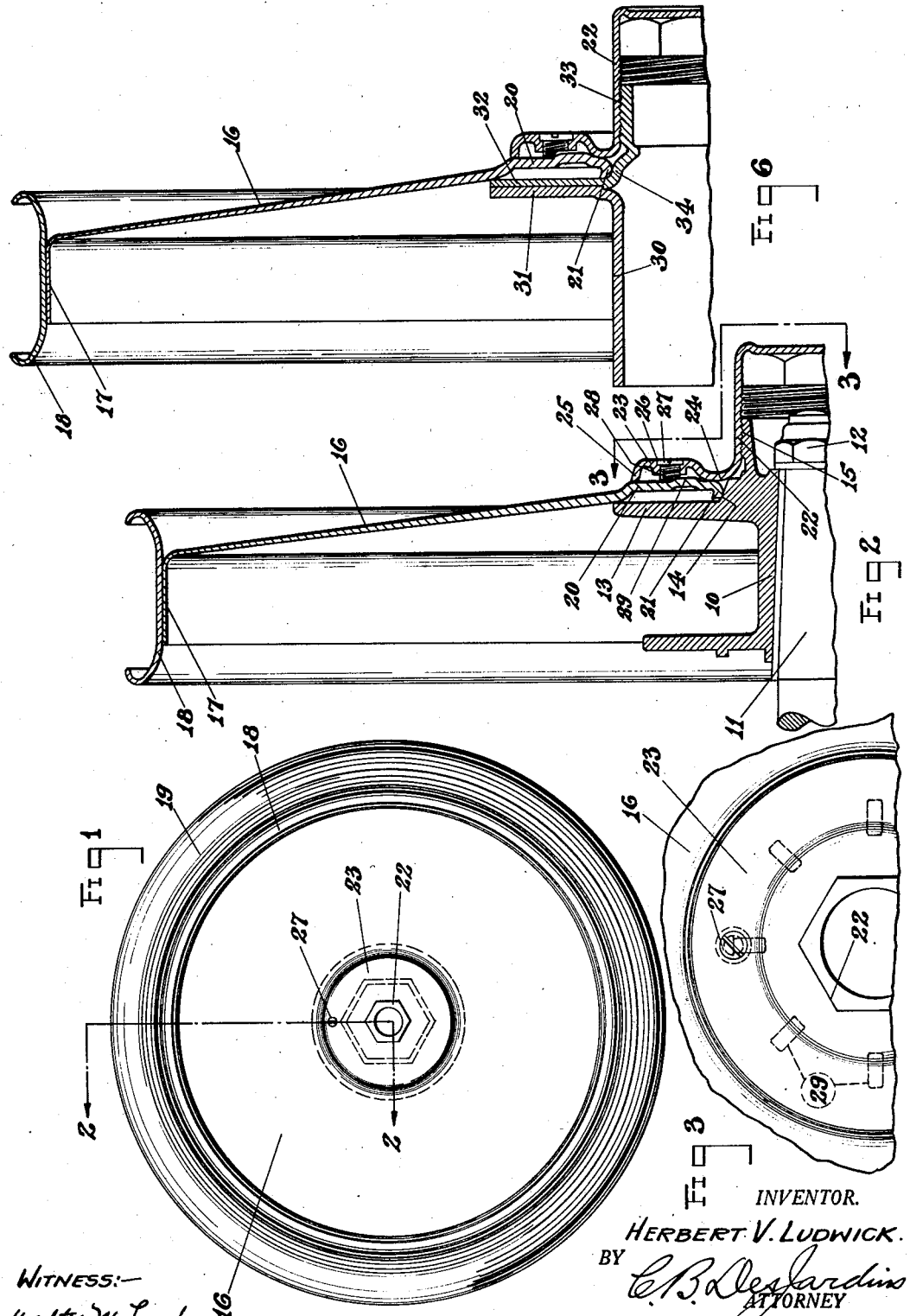
INVENTOR.
HERBERT V. LUDWICK.
BY
ATTORNEY
WITNESS:—
Walter M. Trout.

July 5, 1927.

H. V. LUDWICK

WHEEL

Original Filed Aug. 1, 1922      2 Sheets-Sheet 2

1,634,786

WITNESS:—
Walter M. Trout.

INVENTOR.
HERBERT V. LUDWICK.
BY
ATTORNEY

Patented July 5, 1927.

1,634,786

UNITED STATES PATENT OFFICE.

HERBERT V. LUDWICK, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

WHEEL.

Application filed August 1, 1922, Serial No. 578,896. Renewed March 8, 1927.

My invention relates to improvements in wheels and has to do, more particularly, with demountable disc wheels for automobiles.

The chief object of my invention is to provide a simple and efficient demountable disc wheel which is comparatively light and may be manufactured at a low cost.

Another object of my invention is to provide a simple and efficient driving connection between the hub and the demountable disc of a disc wheel, of such construction that it may be manufactured cheaply and readily.

A further object of my invention is to provide inherently resilient means for effecting a clutch connection between the demountable disc of a disc wheel and the hub which receives it.

A further object of my invention is to provide a hub cap for retaining a demountable disc wheel on the hub and simple and effective means for preventing the unscrewing of the hub cap.

Further objects, and objects relating to economies and details of construction and operation will definitely appear from the detailed description to follow. In one instance, I accomplish the objects of my invention by the devices and means described in the following specification. My invention is clearly defined and pointed out in the appended claims. A structure constituting a preferred embodiment of my invention is illustrated in the accompanying drawing, forming a part of this specification, in which:

Fig. 1 is a plan view of a wheel embodying my invention.

Fig. 2 is an enlarged, radial, sectional view through the wheel, taken on the line 2—2 of Fig. 1.

Fig. 3 is a fragmentary, enlarged plan view of the central portion of the wheel.

Fig. 6 is a radial, sectional view through a wheel, showing a slightly modified form of hub.

In the drawings, the same reference numerals refer to the same parts throughout the several views and the sectional views are taken looking in the direction of the arrows at the ends of the section lines.

Figure 4:
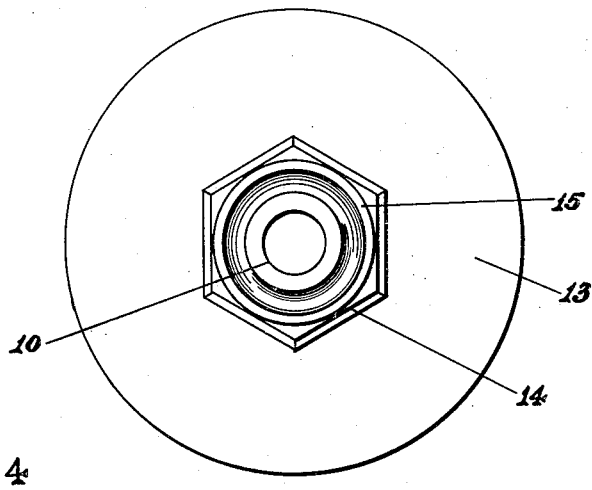
Fig. 4 is an enlarged view of the inner hub in elevation, looking at the outer end of the hub.
Figure 5:
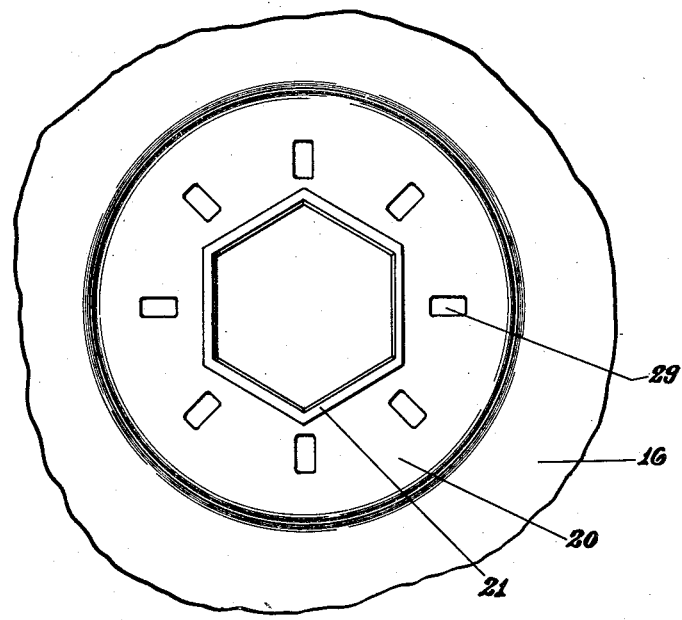
Fig. 5 is a view in elevation of the central portion of the disc, showing the portions which fit on the inner hub.

The chief purpose of my invention is to produce a wheel of small weight, which can be manufactured for sale at a low price and which will, nevertheless, be strong and durable and satisfactorily meet conditions arising in use on a motor vehicle. The demountable disc must be so connected with the hub of the wheel that the two parts turn as one when the wheel is in use but, nevertheless, this connection between the disc and hub must be of such a nature that it can be easily and quickly removed from the hub, in case it is necessary to change wheels on the road. It is also desirable to provide means for preventing the inadvertent release of the driving connection between the disc and the hub, so that the disc will not come off accidentally. In demountable disc wheel constructions at present in use, a considerable portion of the cost is due to the operations required to form the disc and the hub so as to provide for a releasable connection between them, and it is among the special purposes of my invention to provide a releasable connection between the hub and the disc of a demountable disc wheel, which, while simple and effective, is comparatively inexpensive to produce. I propose to provide a hub having a radial flange and a driving shoulder at the base of said flange which is of non-circular cross section. This shoulder may well be tapered to facilitate the mounting of the disc thereon and a convenient form for manufacture consists in a frustro-pyramidal driving shoulder. The wheel disc has the usual central opening and the metal at the edge of this opening is formed into a seat or surface corresponding with and fitting upon the driving shoulder. I also propose to form an annular rib in the disc, adjacent the central opening therein, so that the disc engages the flange of the hub near the periphery thereof and the rib bridges the space between such point of contact and the driving shoulder. I propose to retain the demountable disc in place on the hub by a hub cap screwed on the hub and having a radial flange engaging the rib on the disc.

The rib of the disc yields somewhat and its resilience sets up a force acting against the hub cap and tending to prevent its unscrewing, acting after the manner of a spring washer.

The wheel which I have illustrated in the accompanying drawing as constituting one specific embodiment of my invention, consists of a hub, 10, mounted on the drive shaft, 11, and secured thereto by the nut, 12, in the usual manner. The hub, 10, is provided with the radial flange, 13, and with a tapered, driving shoulder, 14, at the base of said flange, which shoulder is of frustro-pyramidal form, being hexagonal in cross-section, as shown. The outer end of the hub is cylindrical and externally threaded, at 15, said portion being of smaller diameter than the driving shoulder, 14, so as to permit the disc to pass over. The demountable portion of the wheel comprises the wheel disc, 16, which is shown as tapered, but, obviously, may be untapered if desired, and which is provided with a peripheral flange, 17, to which the rim, 18, is secured, said rim carrying the tire, 19, as shown in Fig. 1. A central opening is formed in the disc, 16, and an annular rib, 20, is pressed into the disc surrounding said central opening. The metal at the inner edge of said rib is pressed inwardly, forming the flange, 21, which is so shaped as to form an internal, frustro-pyramidal driving seat or surface which fits the driving shoulder, 14, and which is preferably tapered, somewhat, to correspond with the taper of the driving shoulder, 14. The disc, 16, engages the peripheral portion of the flange, 13, adjacent the outer edge of the annular rib, 20, as shown in Fig. 2, but the main portion of said rib is spaced away from the flange, 13, as clearly indicated in said figure. A hub cap, 22, is screwed upon the externally threaded portion, 15, of the hub and this hub cap has the radial flange, 23, having a portion, 25, adapted to contact with the rib, 20, near the outer edge thereof and a portion, 24, adapted to contact with the rib, 20, near the inner edge thereof and near the driving seat formed on the flange, 21, of the disc. The portion of the flange, 23, between such zones of contact, 24 and 25, is spaced away from the rib, 20.

In order to prevent the unscrewing of the hub cap, 22, I have provided a plurality of oblong bosses, 29, pressed into the rib, 20, at equal radial distances from the center of the disc. The hub cap flange, 23, has a boss, 26, in which a locking screw, 27, is threaded. The end of this screw is partly cut away, forming a shoulder, 28, at substantially the same radial distance from the axis of the wheel, as the outer ends of the bosses, 29. When this screw, 27, is in the position shown in Figs. 2 and 3, the hub cap is free to turn because the shoulder, 28, clears the bosses, 29. By turning the screw, 27, from this position, however, the shoulder, 28, strikes the nearest boss, 29, and thus prevents the unscrewing of the hub cap.

In Fig. 6, I have shown a modified form of hub which may be constructed entirely of stampings. The radial flange against which the disc, 16, bears is formed by the two radial flanges, 31 and 32, on the sleeves, 30 and 33, these two flanges being rigidly secured together, as shown in Fig. 6. The sleeve, 33, has the frustro-pyramidal driving shoulder, 34, formed thereon and the disc, 16, cooperates with such driving shoulder in the same manner as in the construction heretofore described. The hub cap, 22, is screwed upon the externally-threaded end of this sleeve, 33.

It will be observed that this wheel construction is one which can be manufactured very readily. The driving shoulder, 14, on the hub, can be made by a very simple machining operation, so that the cost of the hub is small. The disc may be very readily formed so as to produce the annular rib, 20, with the driving flange, 21. The hub cap, 22 is a comparatively simple stamping. It follows from this that the entire wheel may be constructed at a low cost. The use of the non-circular driving shoulder, as a means of effecting a clutch connection between the demountable disc and the hub, provides a construction in which the demountable disc can be very quickly and readily removed from the hub when the hub cap is removed. The removal of the hub cap is a simple operation, as all that is required is to set the screw, 27, in the proper position and apply a wrench to the end of the hub cap, 22. The hub cap flange, 23, engages the annular rib, 20, of the disc, at two spaced zones of contact located between the zones at which the disc contacts with the flange, 13, and the driving shoulder, 14, respectively. There is sufficient resiliency in the metal used to permit a slight yield in the rib, 20, of the disc, which sets up a force acting like a spring washer on the hub cap, 22, to prevent an accidental unscrewing thereof and resiliently holding the flange, 21, of the disc in tight engagement with the tapered driving shoulder, 14. I have illustrated a driving shoulder of tapered frustro-pyramidal form and of hexagonal cross section but I am not to be restricted to this particular form of driving seat, as other configurations may be used so long as they are of non-circular cross section.

I am aware that the wheel construction illustrated in the accompanying drawings may be changed considerably, without departing from the spirit of my invention and, therefore, I claim my invention broadly, as indicated by the appended claims.

Having thus described my invention, what I claim as new and useful and desire to secure by Letters Patent is:

1. In a wheel the combination of a hub having a radial flange and a tapered driving shoulder of non-circular cross section at the base of said flange, a disc having a central opening therein and an integral annular rib surrounding said opening, said disc having a driving seat at the inner edge of said rib fitting said shoulder, and releasable means for maintaining the disc on the hub in contact with the flange and with said seat and shoulder in driving engagement.

2. In a wheel the combination of a hub having a driving shoulder of non-circular cross section, a disc having a central opening therein and an annular rib surrounding said opening, said disc having a driving seat at the inner edge of said rib fitting said shoulder, and a hub cap screwed on said hub and provided with a radial flange adapted to engage said rib in two spaced zones of contact to maintain the disc seated on the hub with said seat and shoulder in driving engagement.

3. In a wheel the combination of a hub having a radial flange and a driving shoulder of non-circular cross section at the base of said flange, a disc provided with a central opening and an annular rib surrounding said central opening, said disc having a driving seat at the inner edge of said rib fitting the driving shoulder, a hub cap screwed on the hub and having a radial flange provided with portions contacting with the rib of the disc in two spaced zones of contact located between the driving shoulder and the peripheral portion of the hub flange.

4. In a wheel, the combination of a hub having a radial flange and a driving shoulder of non-circular cross-section extending therefrom, a disc having a central opening and an annular rib surrounding said central opening, said disc having a driving seat at one edge of said annular rib fitting said driving shoulder, and releasable means for maintaining the disc on the hub in contact with the flange and with said seat and shoulder in driving engagement.

5. In a wheel the combination of a hub having a radial flange and a driving shoulder of non-circular cross section at the base of said flange, a disc having a central opening, and an annular rib surrounding said central opening, said disc contacting with said hub flange adjacent the outer edge of said rib and having a driving portion at the inner edge of said rib, engaging the driving shoulder of said hub, the body portion of said rib being spaced from said flange, and unitary means engaging the rib of said disc to retain the disc in driving engagement with said hub.

6. In a wheel the combination of a hub having a radial flange and a driving shoulder of non-circular cross section at the base of said flange, a disc having a central opening and an annular rib surrounding said central opening, the outer edge of said annular rib contacting with said flange near the periphery thereof, and the inner edge of said annular rib being formed into a driving surface of non-circular cross section fitting the driving shoulder of the hub, the body portion of said rib being spaced from said hub flange, and a hub cap screwed on said hub and engaging the rib of said disc to retain the disc in driving connection with the hub.

7. In a wheel, a hub, a hub structure having a radially-extending flange, a disc mounted on said flange and contacting therewith along two spaced lines and having its body separated therefrom intermediate said lines; and a clamping means engaging said disc only adjacent each of the said lines of contact.

In testimony whereof, I affix my signature.

HERBERT V. LUDWICK.